UNITED STATES PATENT OFFICE.

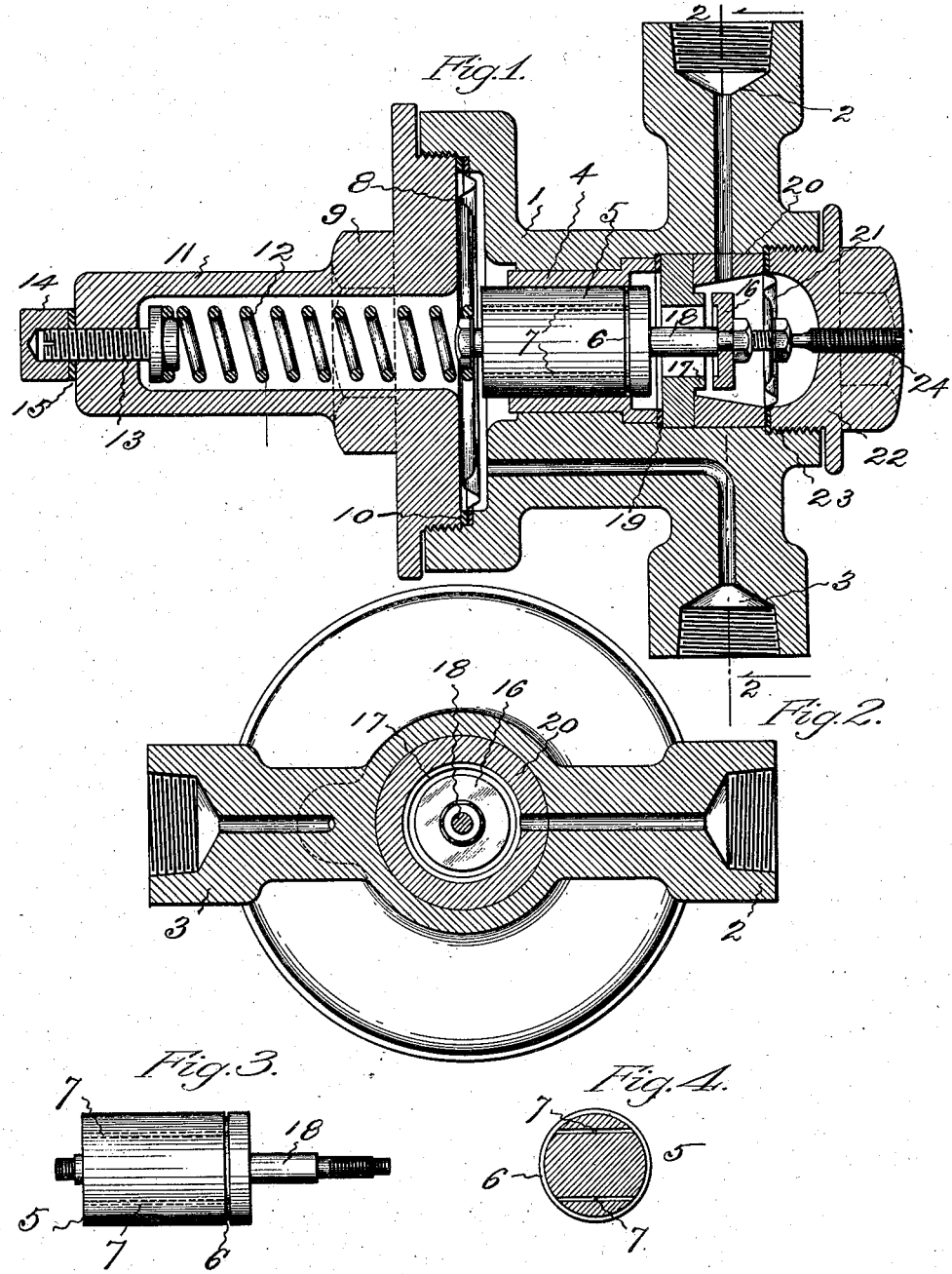

ARTHUR H. EDDY, OF WINDSOR, CONNECTICUT.

EXPANSION-VALVE.

No. 815,912.

Specification of Letters Patent.

Patented March 20, 1906.

Application filed July 19, 1905. Serial No. 270,349.

*To all whom it may concern:*

Be it known that I, ARTHUR H. EDDY, a citizen of the United States, residing at Windsor, in the county of Hartford and State of Connecticut, have invented a new and useful Expansion-Valve, of which the following is a specification.

This valve is particularly designed to be used in a refrigerating system for controlling the flow according to the pressure of such a penetrating fluid as ammonia.

The object of the invention is to provide a comparatively simple easily-constructed valve for this purpose which will surely operate and not easily become clogged or rendered inoperative by any solid substance which may possibly pass in with the fluid and which will be tight at all times and may be readily adjusted, so that it will operate as desired.

Figure 1 of the accompanying drawings shows a central longitudinal section of a valve which embodies the invention. Fig. 2 shows a transverse section on the plane 2 2 looking in the direction indicated by the arrows on Fig. 1. Fig. 3 shows a side view of the valve-plunger, and Fig. 4 shows a section of the plunger.

The body 1 of the valve is cast to shape with an end 2 for the attachment of the inletpipe and an end 3 for the attachment of the outlet-pipe.

In a reduced portion of the body is a lining 4, and fitting rather tightly in this lining is a plunger 5, which has a groove 6 near one end and passages 7 from this groove to the other end, which permit the leakage of a small amount of fluid at the proper time from one end of the plunger to the other. At one end the plunger is attached to a diaphragm 8, that is held in the body by a cap 9. The cap in the form shown is screwed into the body against a packing 10 to insure a tight joint. Located in a hub 11, that extends from the cap, is a spiral spring 12, which tends to thrust the diaphragm and plunger inwardly. The outer end of this spring rests against a stud 13, which is screwed into the end of the cap and may be turned for adjusting the degree of tension of the spring, a nut 14 and a packing 15 being provided for locking the screw-stud and keeping the joint tight. A flat valve 16, that is adapted to close against and open from a seat 17, which it driven into an opening in the body, is fastened to a stem 18, that projects from one end of the plunger. A packing 19 is placed between this valve-seat and the lining in order to insure a tight joint at this end. A thimble 20 is driven into the body outside of the valve-seat. A diaphragm 21, that is held in the body between the thimble and the plug 22, that is screwed into the end of the body, is also fastened to the plunger-stem. A packing 23 is arranged to insure tight joints at the inner end of this plug. A screw 24, held by this cap, is arranged to be turned for determining the amount of outward movement of the small diaphragm that is connected with the stem of the plunger.

When the pressure of the expanded fluid in the system on the expansion side of the valves drops so low that the pressure on the large diaphragm is less than the tension of the spring, the spring thrusts the plunger inwardly and opens the valve. As the valve is opened from its seat liquid from the compression side of the valve flows through the inlet past the valve and leaks around the plunger into the groove and through the passages in the plunger to the chamber containing the large diaphragm, and from this chamber it flows to the outlet. After sufficient fluid has passed through the valve and the pressure on the expansion side rises sufficiently to cause the diaphragm to force back the spring the plunger is drawn outwardly and the valve closed against its seat and stops the flow of fluid. The small diaphragm is designed to effect a counterbalance to the pressure against the valve and end of the plunger, so that these parts will move freely when the predetermined pressures result.

The invention claimed is—

1. An expansion-valve having a body with an inlet, an outlet and a valve-seat between the inlet and outlet, a plunger located on the outlet side of the valve-seat, a valve located on the inlet side of the valve-seat and connected with the plunger, a diaphragm on the outlet side of the valve-seat and connected with the plunger, and a diaphragm on the inlet side of the valve-seat and connected with the plunger, substantially as specified.

2. An expansion-valve having a body with an inlet, an outlet and a valve-seat between the inlet and outlet, a plunger located on the outlet side of the valve-seat between the seat and the outlet, a valve located on the inlet side of the valve-seat and connected with the plunger, and a diaphragm on the outlet side of the valve-seat and connected with the plunger, substantially as specified.

3. An expansion-valve having a body with an inlet, an outlet and a central chamber, a valve-seat inserted into the chamber, a plunger movable in the body on the outlet side of the valve-seat, a valve movable in the body on the inlet side of the valve-seat and connected with the plunger, a small diaphragm on the inlet side of the seat and connected with the valve, a large diaphragm on the outlet side of the seat and connected with the plunger, a cap holding the large diaphragm in place, and a plug holding the small diaphragm in place, substantially as specified.

ARTHUR H. EDDY.

Witnesses:
ETHEL M. LOWE,
HARRY R. WILLIAMS.